3,754,082
PROCESS AND COMPOSITION FOR BOTFLY LARVAE ELIMINATION
Richard J. Mack, Overland Park, Kans., assignor to Richardson-Merrell, Inc., New York, N.Y.
No Drawing. Filed June 11, 1970, Ser. No. 45,580
Int. Cl. A61k 9/00, 27/00
U.S. Cl. 424—33                                                     16 Claims

ABSTRACT OF THE DISCLOSURE

Treatment of equine with choline xanthate to eliminate botfly larvae from the gastrointestinal tract of equines is disclosed. Novel choline xanthate compositions in coated and uncoated form are disclosed as effective for such treatment.

---

This invention relates to compositions of matter and processes of using them for the elimination of the larvae of botflies from the gastrointestinal tract of equine.

Botflies and their larvae are important economic pests which are harmful to horses and other equine for most of the year in the United States. The seriousness of the botfly problem is indicated by the fact that botfly larvae are generally found in about 90% of horses examined. There are three principal species of botflies: the common botfly (*Gastrophilus intestinalis*), the nose botfly (*Gastrophilus haemorrhoidalis*), and the throat botfly (*Gastrophilus nasalis*). The females of these species annoy the animals by darting about laying eggs in the hair of the forelegs, their shoulders, the belly and other parts of the animal, or, in the case of the throat botfly, eggs may be laid on the hair under the jaws of the animal, and the nose botfly deposits eggs at the lips or on the hair close to the skin of the upper and lower lips of the animal. These eggs hatch within various periods of time ranging from about two days up to two or three months. The animal licks or bites itself at the spot where the eggs have been attached, and the warmth of the animal's mouth stimulates hatching of larvae which are then taken into the animal's stomach or the forward end of the small intestine where they attach themselves and remain until they mature, which may require a total larval development period of ten to eleven months.

The damage caused by botflies and their larvae is both direct and indirect. The direct damage might be caused by the animals defending themselves against the onslaught of the egg-laying females. The animals fear these flies and do what they can to get rid of them by bobbing their heads, rubbing their lips against surfaces such as their watering troughs, or against stones or other objects, and by running away. While the horses are fighting the flies they are unable to graze and may lose weight and suffer for malnutrition.

Direct damage to the animals is caused by the botfly larvae which attach themselves to the walls of the animal's stomach or intestine, where they cause inflammation which interferes with digestion, so that infected animals may suffer from colic or other gastric disturbances. The number of larvae infesting one horse may rise to over 1,000 in the case of a heavily infected animal.

Various treatments to prevent infestation of botfly larvae or to eliminate those that have already entered the gastointestinal tract are available. Carbon disulfide, for instance, has been used for many years as a fumigant to remove the botfly larvae. This chemical causes the larvae to release their hold on the walls of the stomach and intestine and are thus removed. However, carbon disulfide must be administered by a stomach tube. The use of carbon disulfide, moreover, is disadvantageous in that it is relatively toxic, extremely flammable, irritating, and can produce severe inflammation of the pharyngeal and gastric mucosa. Accidental exposure of the animal and the veterinarian attendant may result in respiratory distress and other toxic manifestations. Consequently, other drugs have been developed for dislodgment of the botfly larvae from the gastrointestinal tract of equine.

We have discovered that compositions containing choline xanthate are effective in removing the larvae of botflies from the gastrointestinal tract of heavily infested equine, as well as preventing the larvae from attaching themselves to the mucous lining of their stomaches and intestinal tracts when the material is used in accordance with the teachings of the present invention.

Choline xanthate is described in U.S. Pat. No. 2,972,613, issued Feb. 21, 1961, to Myer Freed. It is prepared by reacting equimolar proportions of choline and carbon disulfide in aqueous solution at temperatures below 45° C. Choline xanthate, as prepared and described in the patent, is useful in animal nutrition because of its choline content, but is more advantageous than choline chloride, which is often used for the same purpose, because it is less hygroscopic, is more stable, and does not have the disagreeable odor of other choline compounds. As commercially available, it is a light yellow, crystalline free-flowing powder that is easily mixed with animal feeds and may also be mixed with various pharmaceutical excipients and dispersing agents. It is poorly soluble in water and hence cannot be dissolved to form therapeutically effective solutions without the aid of other substances.

Bot larvae may be removed from the gastrointestinal tract of equine in accordance with the present invention by a single dose of choline xanthate, preferably administered by means of a stomach tube in amounts which may range from about 50 mg. per kilogram of body weight up to about 300 mg. per kilogram of body weight, preferably about 132 mg. per kilogram. Preferably, the animal has fasted about twelve hours, or overnight, before administration of the choline xanthate. If desired, the animal may be allowed to drink a little water, a half-gallon or so, about three hours before the treatment. Fasting and withholding water should continue for another three hours. Ordinarily this treatment will remove from 90 to 100% of the attached bots within 24 hours. The treatment may be repeated in 6 to 8 weeks, particularly if there is any danger that the animal may have become reinfested in the meantime.

The choline xanthate is also suitable for prophylactic treatment of equine against botflies and for this purpose about 1 to about 50 mg. per kilogram of body weight of the choline xanthate is employed. Preferably, choline xanthate is administered for prophylaxis at a 1 gram daily rate during the botfly season. In many cases, however, it may be desirable to employ sufficient choline xanthate therapeutically to remove bots from infested equine followed by prophylactic treatment at a reduced level of choline xanthate.

In preliminary experiments, stomachs from freshly killed horses were collected from an abattoir. The esophogeal and pyloric ends were ligated in a manner which would assure retention of the ingesta and contents of the stomach. The stomachs were placed in plastic bags and immersed in isotonic fluid which was maintained at body temperature. The esophogeal ligation was loosened and each stomach was infused with a predetermined quantity of choline xanthate suspended in water. The stomachs were again immersed in the fluid which was maintained at body temperature. At hourly intervals, observations were made on the action of the choline xanthate. In summary, it was found that as little as 5 grams of choline xanthate was effective in detaching bots from the lining of the stomach. In one case, as little as 7.5 grams of choline xanthate resulted in detachment of 99.5% of the bots in the stomach in an elapsed time of 60 minutes. In other cases, 15 grams of the choline xanthate resulted in 100% detachment of the bots in 60 minutes. These results were found to be more effective than 15 grams of piperazine-1-carbodithioic acid betaine.

It was also found that the choline xanthate produced little or no irritation to the stomach tissue, either in in vitro or in in vivo experiments, at levels of as high as 90 grams per stomach. This was not the case when carbon disulfide or piperazine-1-carbodithioic acid betaine were used, both of which produced erythemia of the mucosa and tissue of the horse stomach.

The choline xanthate may be administered in the form of tablets, in solution, as a powder or granule in or on feed, as a paste or as a solid suspended in a non-reactive vehicle. The preferred route of administration is through the oral cavity or directly into the stomach by means of a catheter-type tube which is passed down the esophagus and into the stomach. Application of the choline xanthate to the infected external body surfaces in the form of a topical ointment or cream may also be desirable under some circumstances.

The following examples are illustrative of the invention in which the parts are by weight unless otherwise specified.

One form of the choline xanthate suitable for therapeutic use in treating equine against botfly larvae is as a water dispersible powder. Such a water dispersible powder is prepared, for example, by combining and mixing the choline xanthate with a cold water-soluble suspending agent, preferably free of hydroxyl groups, and a hydrophilic water-soluble or dispersible suspending agent. Suitable suspending agents include granular microcrystalline cellulose and starch and suitable dispersing agents include polyoxyalkylene derivatives of hexitol anhydride partial long chain fatty acid esters, as well as sodium lauryl sulfate, sodium sulfosuccinate, ethylene oxide condensation products with propylene oxide-propylene glycol reaction products and represented empirically by $$HO(C_2H_4O)_x(C_3H_6O)_y(C_2H_4O)_zH,$$

and the like. Illustrative of such a water dispersible powder formulation of the active compound there may be mentioned, for example, the following exemplarly formulation.

EXAMPLE 1

| Formulation: | Parts |
| --- | --- |
| Choline xanthate | 78.0 |
| Pre-gelatinized starch | 20.0 |
| Polyoxyethylene sorbitan monolaurate | 2.0 |
| | 100.0 |

Twenty parts of pre-gelatinized starch was placed in a mixer and 2.0 parts of polyoxyethylene sorbitan monolaurate was added slowly with mixing, to avoid clumping, until a substantially homogeneous mixture was obtained followed by the addition of 78.0 parts of choline xanthate and mixing for a period of from about 15 minutes to 1 hour until a homogeneous mixture was obtained. The resulting powder is water dispersible. Administration of such a water dispersible powder to equine in doses ranging from about 50 to 300 mg./kg. body weight and higher, results in detachment of bots commencing within 1 to 3 hours and continuing for about 72 hours and beyond. At these dosage levels 90–100% detachment of the bot larvae in the animal's gastrointestinal tract occurs within 72 hours.

Although choline xanthate may be administered in its natural state as a crystalline powder it has been found that improvements in odor, palatability and stability are obtained if the choline xanthate is coated with a protective coating or compressed into a tablet which is then coated with a protective film.

A preferred embodiment of the invention is that wherein the choline xanthate is formulated as coated spheres which can be employed to prepare suspensions, pastes, dispersible powder and tablets. Illustratively, choline xanthate is formulated with known excipients and by the use of extrusion type granulating device, such as a Model EXDCS–100 extruder, in conjunction with a spheroid producing machine, such as a Model Q–400 Marumerizer, shaped into substantially uniform spheres of diameters ranging from 0.5 to 15 mm. as described hereinafter. These spheres are then dried and coated with a uniform, acid-soluble protective coating. The most suitable protective coatings for this purpose are acrylic resin coatings of the type marketed as Eudragit E, Eudragit L and Eudragit S. Mixtures of said acrylic resins may also be employed. Eudragit E is a copolymer of dimethylaminoethyl methacrylate and butyl methacrylate and Eudragit L and S are copolymers of methylmethacrylate and methacrylic acid.

Illustrative of such a coated product is that obtained using the following formulation.

EXAMPLE 2

| Formulation: | Parts |
| --- | --- |
| Choline xanthate | 80.0 |
| White oil | 1.0 |
| Granular microcrystalline cellulose | 19.0 |
| | 100.0 |

| Coating material: | |
| --- | --- |
| Acrylic resin (Eudragite E) | 12.5 |
| Acetone | 35.0 |
| Isopropyl alcohol | 52.5 |
| | 100.0 |

70.0 parts of choline xanthate and 16.6 parts of granular microcrystalline cellulose were placed in a suitable mixer, such as a Hobart, Z-bar, twin shell mixer, and 0.9 part of mineral oil (light white rose oil having a viscosity of about 65 to 75 Saybolt at 38° C. and a specific gravity at 15.5° C. of about 0.840 to 0.850) was added with mixing until a homogeneous composition was obtained. Sufficient deionized water was added to bring the mixture to the desired consistency wherein the mixed materials are just starting to cling together. For example, a 20.8 kg. batch would require about 11.5 liters of deionized water to provide the required consistency. The resulting mass was passed through a model EXDCS–100 twin extruder with a 3 mm. screen to produce strands of the material. To a model Q–400 Marumerizer spheronizing machine running between 800 and 1400 r.p.m. was added a maximum load of the extruded material wherein the material was rolled for a period of from 15 to 120 seconds, as required, to form spheres of the material. The spheres of material formed were approximately 1.75 mm. in diameter and were discharged onto a drying tray no deeper than 1 inch where the spheres were dried at 110° F. for a period of 8 to 16 hours. Alternatively, the spheres may be dried in a fluid bed dryer operating at 110° F. for a period of 10 to 20 minutes.

The dried spheres were then spray coated with a coating solution comprised of 12.5 parts of a Eudragit E copolymer synthesized from dimethylaminoethyl methacrylate and butylmethacrylate and having the following idealized formula

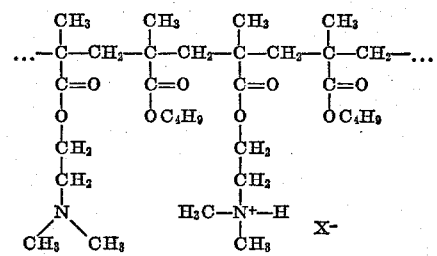

35 parts of acetone and 52.5 parts of isopropyl alcohol. After coating the spheres with sufficient coating solution to provide about 12.5% Eudragit E in the final product the coated spheres were dried for a period of from 8 to 16 hours in the absence of additional heat.

These coated pellets are preferably used for prophylactic treatment of equine and are generally employed to provide from 1 to 50 milligrams of chlorine xanthate per kilogram of body weight daily for a period of from about 1 month to about 9 months or longer.

Another form of the invention is as fast dissolving choline xanthate granules which may also be coated with an acid-soluble coating like that employed with the hereinbefore described coated pellets. As exemplary of such choline ranthate granules there may be mentioned for example, those formed from the following formulation.

EXAMPLE 3

| Formulation: | Parts |
|---|---|
| Choline xanthate | 50.0 |
| Magnesium-aluminum silicate | 5.0 |
| Pre-gelatinized starch | 20.0 |
| Granular microcrystalline cellulose | 14.5 |
| Sodium lauryl sulfate | 0.5 |
| Polyvinylpyrrolidone | 10.0 |
| | 100.0 |

All the ingredients were placed into a Z-bar mixer where they were mixed for about 30 minutes then followed by the addition of sufficient isopropyl alcohol until a homogeneous mixture having the desired consistency, wherein the materials being mixed are just starting to cling together, is obtained. The mixture is passed through a granulator equipped with a No. 4 screen and the resulting granules are dried on a drying tray in an oven at 110° F. for a period of from 8 to 16 hours.

The dried granules are then spray coated with a coating solution comprised of 12.5 parts Eudragit E copolymer, 32.0 parts acetone and 52.5 parts isopropyl alcohol in the manner described in Example 2.

These coated granules are preferably used for therapeutic treatment of equine and are generally employed to provide from 50 to 300 milligrams choline xanthate per kilogram of body weight, preferably about 66 to about 132 milligrams per kilogram.

A further embodiment of this invention is that wherein the choline xanthate is in the form of a bolus tablet. As exemplary of such a choline xanthate bolus tablet there may be mentioned, for example, a bolus tablet formed from the following formulation.

EXAMPLE 4

| Formulation: | Parts |
|---|---|
| Choline xanthate | 25.0 |
| Polyvinylpyrrolidone | 20.0 |
| Corn starch | 42.5 |
| Polyvinylpyrrolidone | 2.5 |
| Corn starch | 3.0 |
| Talc | 0.5 |
| Magnesium stearate | 0.5 |
| Granular microcrystalline cellulose | 6.0 |
| | 100.0 |

The choline xanthate (25.0 parts), polyvinylpyrrolidone (20.0 parts) and corn starch (42.5 parts) were placed in a Z-bar mixer were they were thoroughly mixed. A 10% solution of 2.5 parts of polyvinylpyrrolidone in isopropyl alcohol was prepared and slowly added to the mixture with additional mixing to achieve the desired consistency wherein the materials are just starting to cling together. The mixture is passed through a granulator (Stokes Oscillator) equipped with a No. 4 screen and the resulting granules are dried on a drying tray at 100° F. for about 16 hours. The dry granulation is passed through the granulator a second time using a No. 10 heavy duty screen. The resulting granules are placed in a mixer and corn starch (3.0 parts), talc, magnesium stearate and granular microcrystalline cellulose added followed by mixing for about 15 minutes. The mixture was then compressed into bolus tablets of about 45 grams and 21.2 kilograms hardness.

A still further embodiment of this invention is found in the form of a polyethylene glycol-alfalfa meal coated chlorine xanthate tablet. Exemplary of such a coated tablet is that formed from the following formulation.

EXAMPLE 5

| Formulation: | Parts |
|---|---|
| Choline xanthate | 50.0 |
| Polyvinylpyrrolidone | 21.5 |
| Corn starch | 9.5 |
| Feed flavoring mixture | 7.5 |
| Flavor and aroma intensifier | 2.5 |
| Molasses | 5.0 |
| Polyvinylpyrrolidone | 1.5 |
| Potassium sodium copper chlorophyllin complex | 0.5 |
| Talc | 1.0 |
| Magnesium stearate | 1.0 |
| | 100.0 |

Tablets containing 50 milligrams of choline xanthate are prepared from the above formulation by employing standard tableting techniques. The tablets were then spray coated with a coating solution comprised of 12.5 parts Eudragit E copolymer, 32.0 parts acetone and 52.5 parts isopropyl alcohol until the tablets had about 7.8% Eudragit E in the coated tablets.

A mixture of 85.8 parts polyethylene glycol and 14.2 parts dehydrated alfalfa meal were placed in a vessel, heated and mixed well until a warm viscous fluid mixture was obtained. In a tablet mold, sufficient warm, fluid polyethylene glycol-alfalfa meal mixture was poured to cover the bottom of the mold. The choline xanthate tablet was inserted in the mold and sufficient polyethylene glycol-alfalfa meal mixture was poured into the mold to cover the tablet. The coated tablet was ejected from the mold after cooling to harden the coating.

The tablets, prepared as described above, may be used for either prophylactic or therapeutic treatment of equine and are employed to provide from about 2 to about 300 milligrams choline xanthate per kilogram body weight.

Although the invention has been particularly described in embodiments employing specific materials in the various formulations, it will be readily appreciated that any suitable flavor enhancers, appetite stimulators, extending agents, flow aids, plasma extenders, suspending agents, thickeners, and feed nutrients can be employed without departing from the spirit and scope of the invention.

What is claimed is:

1. A process for treating equine for the elimination of botfly larvae from the gastrointestinal tract of equine comprising administering an effective quantity of choline xanthate to an equine.

2. The process of claim 1 wherein the effective quantity of choline xanthate employed is a therapeutically effective quantity of from about 50 to 300 milligrams per kilogram of body weight.

3. The process of claim 1 wherein the effective quantity of choline xanthate employed is a prophylactically effective quantity of from about 1 to about 50 milligrams per kilogram of body weight.

4. The process of claim 2 wherein the administration of the choline xanthate is an administration by means of a stomach tube.

5. The process of claim 3 wherein the administration of choline xanthate for prophylaxis is at a 1 gram daily rate.

6. The process of claim 2 wherein the choline xanthate employed is in the form of choline xanthate particles in spheriodal form of substantially uniform diameter of from about 0.5 to 1 mm. and coated with an acrylic resin coating selected from a copolymer of butyl methacrylate and dimethylaminoethyl methacrylate or a copolymer of methacrylic acid and methyl methacrylate.

7. The process of claim 2 wherein the choline xanthate employed is in the form of a water-dispersible powder of a mixture of choline xanthate, pre-gelatinized starch and polyoxyethylene sorbitan monolaurate.

8. The process of claim 3 wherein the choline xanthate employed is in the form of pellet of choline xanthate, white oil and granular microcrystalline cellulose, said pellet being coated with an acrylic resin coating selected from a copolymer of butyl methacrylate and dimethylaminoethyl methacrylate or a copolymer of methyl methacrylate and methacrylic acid.

9. The process of claim 1 wherein the choline xanthate employed is in the form of a tablet of a choline xanthate, said tablet being coated with a polyethylene glycol-alfalfa meal coating.

10. A composition of matter for treating equine to prevent or eliminate botfly larvae infestation in the gastrointestinal tract comprising a water dispersible powder of a mixture of about (a) 1 to about 200 milligrams of choline xanthate as the primary active ingredient; (b) a cold water soluble suspending agent selected from the group consisting of microcrystalline cellulose and starch, and (c) a hydrophylic dispersing agent selected from the group consisting of polyoxethylene sorbitan monolaurate, sodium lauryl sulfate, sodium sulfosuccinate, and ethylene oxide condensation products with propylene oxide-propylene glycol represented empirically by $HO(C_2H_4O)_x(C_3H_6O)_y(C_2H_4O)_zH$.

11. The composition of claim 10 comprising a water dispersible powder of a mixture of choline xanthate, pregelatinized starch and polyoxyethylene sorbitan monolaurate.

12. The composition of claim 11 comprising about 78 parts by weight choline xanthate, 20.0 parts by weight of pre-gelatinized starch and 2 parts by weight polyoxyethylene sorbitan monolaurate.

13. The composition of claim 10 wherein the composition is in the form of choline xanthate particles coated with an acid-soluble protective coating.

14. The composition of claim 13 wherein the choline xanthate particles are speroidal particles of substantially uniform diameter ranging from 0.5 to 15 mm. and coated with an acrylic resin coating selected from a copolymer of butylmethacrylate and dimethylaminoethyl methacrylate or a copolymer of methacrylic acid and methyl methacrylate.

15. The composition of claim 10 comprising a coated pellet of choline xanthate, white oil and granular microcrystalline cellulose wherein said coating is an acrylic resin coating selected from a copolymer of butyl methacrylate and dimethylaminoethyl methacrylate and a copolymer of methyl methacrylate and methacrylic acid.

16. The composition of claim 10 comprising a tablet of choline xanthate, said tablet being coated with a polyethylene glycol-alfalfa meal coating.

References Cited

UNITED STATES PATENTS

| | | | |
|---|---|---|---|
| 3,639,637 | 2/1972 | Campbell | 424—362 |
| 3,251,824 | 5/1966 | Battista | 424—362 |
| 3,092,546 | 6/1963 | Schroeter et al. | 424—361 |
| 3,121,043 | 2/1964 | Tobin et al. | 424—81 |
| 3,087,860 | 4/1963 | Endicott et al. | 424—81 |
| 3,080,346 | 3/1963 | Schellenberg et al. | 424—81 |
| 3,136,695 | 6/1964 | Tansey | 424—362 |
| 3,493,659 | 2/1970 | Magid | 424—362 |
| 2,972,613 | 2/1961 | Freed | 424—246 |

OTHER REFERENCES

Whistler, Starch: Chemistry and Technology, vol. 2, (1967), pp. 532–534.

SAM ROSEN, Primary Examiner

U.S. Cl. X.R.

424—253

UNITED STATES PATENT OFFICE
CERTIFICATE OF CORRECTION

Patent No. 3,754,082      Dated August 21, 1973

Inventor(s) Richard J. Mack

It is certified that error appears in the above-identified patent and that said Letters Patent are hereby corrected as shown below:

Column 1, line 54 -- "for malnutrition" should read "or malnutrition"; line 63 -- "gasto-" should read "gastro-". Column 2, line 10 -- "stomaches" should read "stomachs". Column 4, lines 6 and 48 -- "marumerizer" should be "MARUMERIZER"; lines 12, 16, 28 and 61 -- "Eudragit" should be "EUDRAGIT". Column 5, lines 3 and 38 -- "Eudragit" should be "EUDRAGIT"; line 8 -- "chlorine xanthate" should read "choline xanthate"; line 15 -- "ranthate" should read "xanthate". Column 6, lines 31 and 33 -- "Eudragit" should be "EUDRAGIT"; line 9, "chlorine" should read "choline". Column 7, line 4, claim 6 -- "0.5 to 1 mm" should read "0.5 to 15 mm"; line 30, claim 10 "hydrophylic" should read "hydrophilic". Column 8, line 7, claim 14 -- "speroidal" should read "spheroidal".

Signed and sealed this 18th day of December 1973.

(SEAL)
Attest:

EDWARD M. FLETCHER, JR.
Attesting Officer

RENE D. TEGTMEYER
Acting Commissioner of Patents